United States Patent [19]

Lauer et al.

[11] Patent Number: 5,464,372
[45] Date of Patent: Nov. 7, 1995

[54] CLEANING FAN HAVING SNAP IN BLADES

[75] Inventors: Fritz K. Lauer, Bettendorf, Iowa; David W. Rogers, Moline, Ill.

[73] Assignee: Deere & Company, Moline, Ill.

[21] Appl. No.: 233,866

[22] Filed: Apr. 26, 1994

[51] Int. Cl.$^6$ ........................................... A01F 12/48
[52] U.S. Cl. ............................................... 460/100; 56/12.8
[58] Field of Search ..................... 460/100, 99; 56/12.8, 56/12.9, 13.1, 13.2, 13.3, 13.4

[56] References Cited

U.S. PATENT DOCUMENTS

| | | | |
|---|---|---|---|
| 3,469,773 | 9/1969 | Pool et al. | 460/100 X |
| 4,265,077 | 5/1981 | Peters | 56/14.6 |
| 4,303,079 | 12/1981 | Claas et al. | 56/12.8 |
| 4,906,219 | 3/1990 | Matousek et al. | 460/98 |
| 5,165,855 | 11/1992 | Ricketts et al. | 416/178 |

FOREIGN PATENT DOCUMENTS 560887  10/1957  Belgium.

*Primary Examiner*—Terry Lee Melius

[57] ABSTRACT

The invention is directed to a cleaning fan for an agricultural combine having a snap in mounting assembly for attaching fan blades to the cleaning fan. The cleaning fan comprises at least two wheels, with each wheel having a series of radially extending mounting teeth. The mounting teeth are provided with snap in mounting assemblies comprising inner and outer transverse grooves between which are located inner and an outer projections. The inner groove is located at the outer periphery of the wheel and the outer groove is located on the outer projection. A spring is located between the inner and outer projections. The fan blades are provided with rectangular mounting apertures which engage the projections.

8 Claims, 2 Drawing Sheets

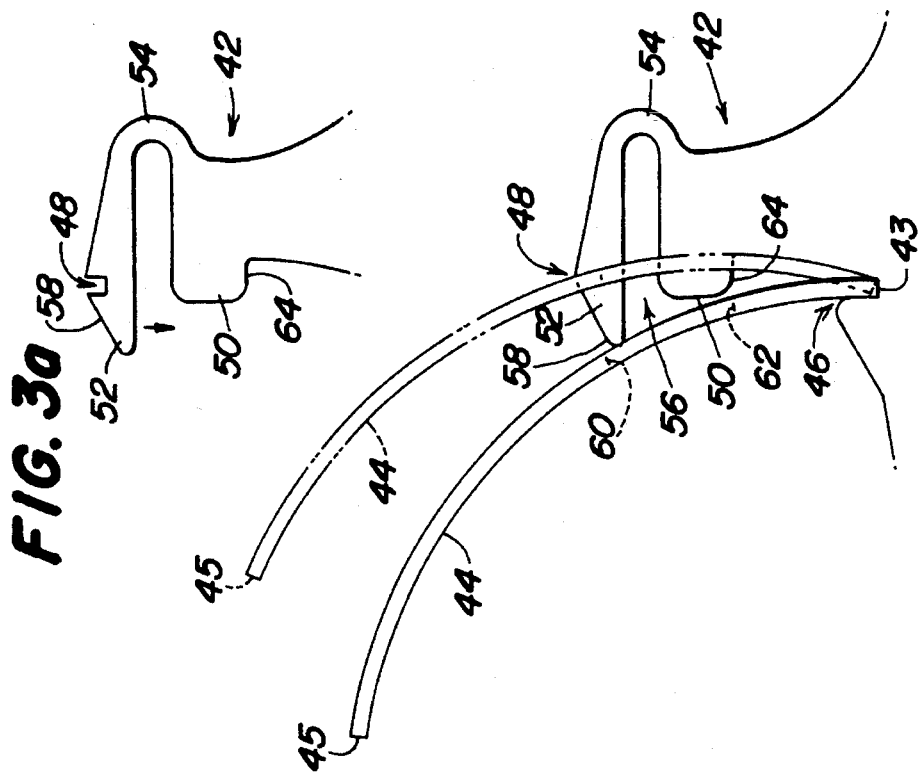
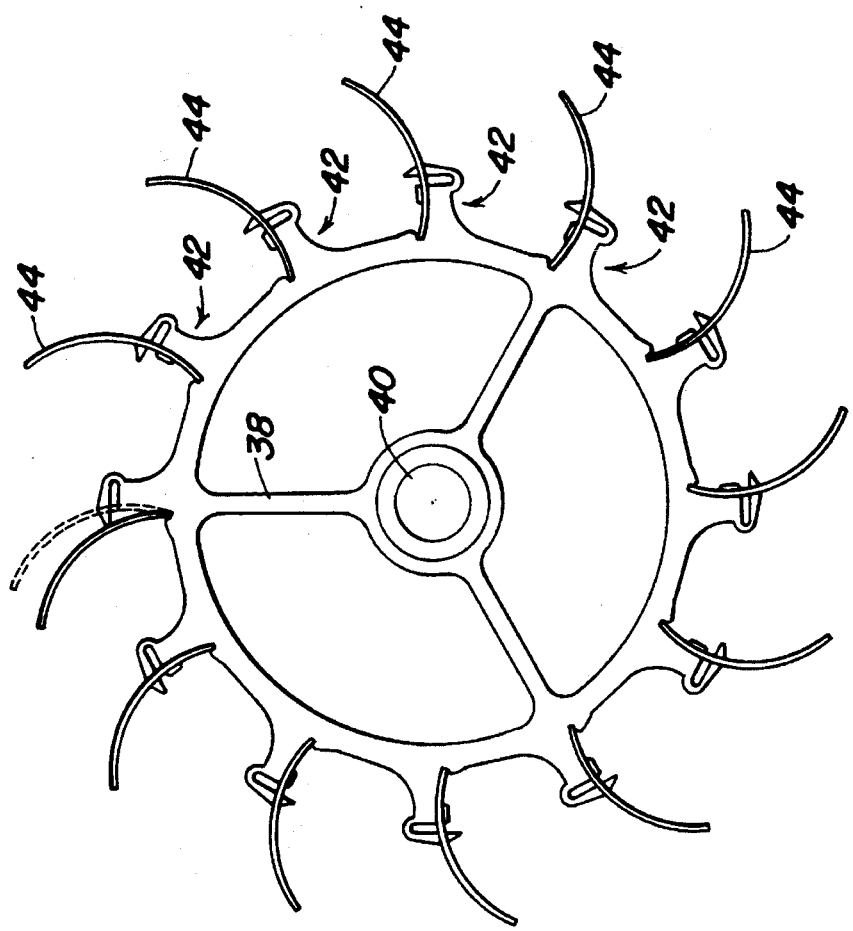

5,464,372

CLEANING FAN HAVING SNAP IN BLADES

BACKGROUND OF THE INVENTION

1. Field of the Invention

The invention is directed to a simple snap in mounting assembly for attaching fan blades to a cleaning fan of an agricultural combine.

2. Description of the Prior Art

Large agricultural combines are provided with cleaning systems for separating chaff from grain. Typically these cleaning systems are provided with oscillating chaffers and sieves through which air is blown by a cleaning fan. The cleaning fan blows the lighter chaff out the rear of the combine while letting the clean grain fall to a collection auger which directs the grain to a grain tank.

U.S. Pat. No. 4,906,219 discloses a cleaning fan having replaceable blades. With this proposed cleaning fan a series of discs are arranged on a transverse shaft. Each disc is provided with a series of apertures around its periphery which receive fan blades. The fan blades are provided with grooves which engage the edges of the apertures locking the blades in place.

U.S. Pat. Nos 4,255,077 and 4,303,079 disclose other cleaning fan assemblies.

SUMMARY

It is an object of the present invention to provide a simple snap in mounting assembly for attaching and removing fan blades to and from a cleaning fan.

The cleaning fan comprises a series of wheels that are mounted to a transverse drive shaft. Each wheel is provided with a number of radially extending teeth having snap in mounting assemblies. Each snap in mounting assembly has an inner transverse groove located at the periphery of the wheel and an outer transverse groove. Inner and outer projections are located between the inner and outer grooves. The outer groove is formed in the outer projection. A spring is located between the inner and outer projections for biasing the outer projection away from the inner projection.

The fan blades are provided with a series of rectangular apertures corresponding to the snap in mounting assemblies. In mounting the blade to the wheels, the blade is inserted into the inner groove and then rotated towards the projections. The top edge of the rectangular aperture engages a camming surface located on the outer projection, driving the outer projection closer to the inner projection and thereby compressing the spring. As the top edge of the rectangular aperture reaches the outer groove, the outer projection springs up locking the blade in the snap in mounting assembly.

To remove a blade from the snap in mounting assembly, the outer projections are first depressed towards the inner projection until the outer groove is clear of the blade. The blade is then rotated away from the projections until it clears the projections. After it clears the projections, the blade can be removed from the inner groove.

BRIEF DESCRIPTION OF THE DRAWING

FIG. 2 is a close up side view of the cleaning fan.

FIG. 3 is a close up side view of a mounting tooth and blade. FIG. 3a is a close up view of the inner and outer projections less the blade.

DETAILED DESCRIPTION

Figure 1:
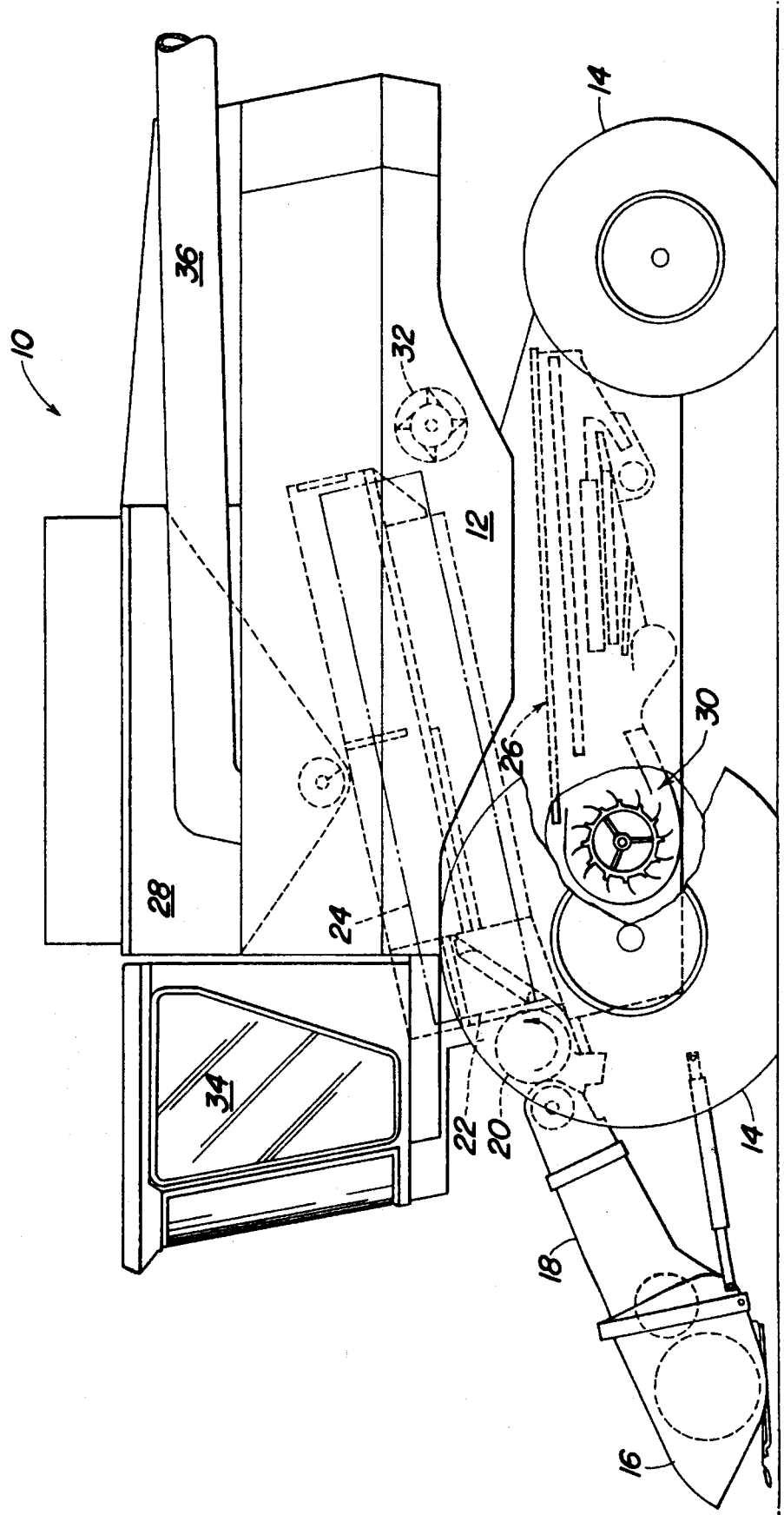
FIG. 1 is a side view of an agricultural combine having a cut away portion showing the cleaning fan of the present invention.

FIG. 1 is the side view of a self-propelled agricultural combine 10. The combine comprises a frame 12 having wheels 14 supporting the frame. Extending forwardly from the combine is a harvesting platform 16 which directs a harvested crop to feederhouse 18. The feederhouse is a conveyor for directing the harvested crop material to the threshing, separating and cleaning assemblies located within the sidesheets of the combine. Although the present invention is disclosed as being mounted on a axial combine it may also be used on conventional and other combine configurations needing a cleaning fan.

In the illustrated combine, the feederhouse 18 directs the harvested crop to a transverse beater 20 which propels the crop material through an inlet transition section 22 to an axial threshing and separating unit 24. Grain and chaff are directed from the axial threshing and separating unit 24 to cleaning assembly 26. The cleaning assembly in turn directs the clean grain to grain tank 28 and the chaff is blown out the rear of the combine by cleaning fan 30. Crop material other than grain and chaff is directed by the axial separating unit to transverse beater 32 which propels this material out the rear of the combine. Clean grain temporarily stored in grain tank 28 can be unloaded by an operator in operator's cab 34 actuating unloading auger 36.

The present invention is directed to the cleaning fan 30. The cleaning fan comprises a number of plastic wheels 38 that are arranged along and journalled to a shaft 40. Each wheel is provided with a series of radially extending mounting teeth which comprise snap in mounting assemblies 42 for fan blades 44. The fan blades 44 extend across the wheels 38 parallel to the shaft 40.

Each snap in mounting assembly 42 has an inner transverse groove 46 located on the periphery of the wheel 38 and an outer transverse groove 48 located on the outer tip of the assembly. Located between the grooves are an inner projection 50 and an outer projection 52. Located between the projections is a spring 54 for biasing the outer projection away from the inner projection. The spring is an integral portion of the outer projection formed by the resilient material from which it is made. The outer groove 48 is located on the outer projection 52.

Each fan blade 44 has a radial inner edge 43 and a radial outer edge 45, and is provided with a series of rectangular openings 56 corresponding to the location of a series of transverse teeth 42 located on the wheels 38. In mounting the blades 44 to the teeth 42, the blade 44 is first inserted into the inner groove 46 and then moved axially along the wheels 38, until the mounting apertures 56 are located adjacent to the snap in mounting assemblies 42. The blade is then rotated towards the inner and outer projections 50 and 52. The rectangular opening 56 engages the inner and outer projections 50 and 52. The outer projection 52 is provided with a slanted camming surface 58 which contacts the top edge 60 of the rectangular opening 56 driving the outer projection 52 towards the inner projection 50 and thereby compressing the spring 54. As the top edge 60 of the blade 44 reaches the outer groove 48 the outer projection snaps away from the inner projection and traps the blade 44 in the mounting tooth. The top edge 60 of the rectangular opening 56 contacts the bottom of the outer groove 48 and the bottom edge 62 of the rectangular opening 56 contacts the bottom surface 64 of the inner projection 50.

To remove the blade 44 the outer projection 52 is depressed towards the inner projection 50 until the outer groove 48 clears the top edge 60 of the rectangular opening 56. The blade 44 is then rotated away form the projections 50 and 52 until the bottom edge 62 clears the bottom surface 64 of the inner projection 50. The blade 44 is then removed from the inner groove 46.

The invention should not be limited to the above-described embodiments, but should be limited solely by the claims that follow.

We claim:

1. A method of mounting a fan blade having mounting apertures to at least two wheels having radially extending mounting teeth with snap in mounting assemblies, the method comprising the following steps:

inserting a fan blade into inner grooves located around the periphery of the wheels;

locating the fan blade in the inner groove so that the mounting aperture of the fan blade corresponds to the snap in mounting assemblies of the respective mounting teeth;

rotating the blade towards the snap in mounting assembly;

depressing an outer projection located on the snap in mounting assembly when said mounting aperture is moved over said snap in mounting assembly as the blade is rotated, the outer projection having an outer transverse groove;

locking the fan blade in place.

2. A cleaning fan for an agricultural combine, the cleaning fan comprising:

a drive shaft;

at least two wheels journalled to the drive shaft, each wheel is provided with a number of radially extending mounting teeth, each tooth is provided a snap in mounting assembly;

at least one fan blade having a radially inner edge, a radially outer edge, and a number of mounting apertures which correspond to the snap-in mounting assembly of each tooth, wherein the mounting aperture has a top edge and a bottom edge that engage the snap in mounting assembly.

3. A cleaning fan as defined by claim 2 wherein each mounting tooth comprises an inner transverse groove and an outer transverse groove, the outer transverse groove contacts the top edge of the mounting aperture and the inner transverse groove contacts the radial inner edge of the fan blade.

4. A cleaning fan as defined by claim 3 wherein the snap in mounting assembly further comprises an inner projection and an outer projection which are located between the inner transverse groove and the outer transverse groove.

5. A cleaning fan as defined by claim 4 wherein the outer transverse groove is formed in the outer projection.

6. A cleaning fan as defined by claim 5 wherein the bottom edge of the mounting aperture contacts the inner projection.

7. A cleaning fan as defined by claim 6 wherein a spring is operatively positioned between the inner projection and the outer projection.

8. A cleaning fan as defined by claim 7 wherein the outer projection is provided with a camming surface which contacts the top edge of the mounting aperture for driving the outer projection towards the inner projection as the fan blade is being mounted to the wheels.

* * * * *